US011846983B2

(12) United States Patent
Wu et al.

(10) Patent No.: US 11,846,983 B2
(45) Date of Patent: Dec. 19, 2023

(54) ELECTRONIC TABLE CARD, FIXED SEAT OF ELECTRONIC TABLE CARD, AND ELECTRONIC TABLE CARD ASSEMBLY

(71) Applicant: BOE TECHNOLOGY GROUP CO., LTD., Beijing (CN)

(72) Inventors: Yunpeng Wu, Beijing (CN); Long Yang, Beijing (CN); Lei Cao, Beijing (CN); Shijie Cao, Beijing (CN); Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 456 days.

(21) Appl. No.: 17/036,057

(22) Filed: Sep. 29, 2020

(65) Prior Publication Data

US 2021/0149442 A1      May 20, 2021

(30) Foreign Application Priority Data

Nov. 19, 2019 (CN) .......................... 201922019988.7

(51) Int. Cl.
*G06F 1/16* (2006.01)
*F16M 13/02* (2006.01)
*F16M 11/04* (2006.01)

(52) U.S. Cl.
CPC ......... *G06F 1/1607* (2013.01); *F16M 11/041* (2013.01); *F16M 13/02* (2013.01); *G06F 1/1626* (2013.01)

(58) Field of Classification Search
CPC .... F16M 11/041; F16M 13/02; G06F 1/1607; G06F 1/1626; G09F 3/208
See application file for complete search history.

(56) References Cited

U.S. PATENT DOCUMENTS

| | | | | |
|---|---|---|---|---|
| 5,855,351 A | * | 1/1999 | Cziraky | A47B 97/04 |
| | | | | 248/460 |
| 6,411,288 B1 | * | 6/2002 | Min | G06F 1/1601 |
| | | | | 345/905 |
| 7,251,125 B2 | * | 7/2007 | Heckerman | A47B 97/04 |
| | | | | 361/679.27 |
| 8,120,897 B2 | * | 2/2012 | VanDuyn | F16M 11/10 |
| | | | | 248/917 |
| 9,578,979 B1 | * | 2/2017 | Zeuch | F16M 13/02 |
| 9,611,881 B2 | * | 4/2017 | Khodapanah | F16M 11/10 |
| 9,835,288 B1 | * | 12/2017 | Matthews | F16M 13/02 |
| 9,945,509 B2 | * | 4/2018 | Barnes | F16M 11/041 |

(Continued)

FOREIGN PATENT DOCUMENTS

| | | | | | |
|---|---|---|---|---|---|
| KR | 2010112807 A | * | 10/2010 | ............ | G09F 3/204 |
| KR | 101522779 B1 | * | 5/2015 | | |

*Primary Examiner* — Eret C McNichols
(74) *Attorney, Agent, or Firm* — Calfee, Halter & Griswold LLP

(57) ABSTRACT

The present disclosure discloses an electronic table card, a fixed seat of an electronic table card and an electronic table card assembly. The electronic table card includes an electronic display screen and a protrusion disposed on the back of the electronic display screen, in which a clamping slot is respectively formed at both sides of the protrusion, opening directions of the clamping slots are opposite to each other, and an extending direction of each of the clamping slots is perpendicular to a direction from a top to a bottom of the electronic display screen.

8 Claims, 4 Drawing Sheets

(56) References Cited

U.S. PATENT DOCUMENTS

| | | | | |
|---|---|---|---|---|
| 10,039,377 B2* | 8/2018 | Willnauer | .............. | F16M 11/16 |
| 10,453,362 B2* | 10/2019 | Bottine | .................. | G09F 3/208 |
| 10,620,667 B2* | 4/2020 | Janzen | .................. | A47B 23/04 |
| 10,706,749 B1* | 7/2020 | White | .................... | G09F 3/204 |
| 10,782,596 B2* | 9/2020 | Wilson | .................. | F16M 11/08 |
| 10,984,202 B2* | 4/2021 | Xie | ................. | G06K 19/07749 |
| 11,122,917 B2* | 9/2021 | Chapuis | ............... | F16M 11/041 |
| 11,151,908 B2* | 10/2021 | Kott | ......................... | G09F 3/20 |
| 11,159,663 B2* | 10/2021 | Chen | ..................... | F16M 13/02 |
| 11,397,447 B2* | 7/2022 | Xie | .......................... | G06F 1/12 |
| 11,493,166 B2* | 11/2022 | Eom | .................. | F16M 11/046 |
| 2005/0247780 A1* | 11/2005 | Lowry | .................. | G09F 3/208 |
| | | | | 235/383 |
| 2012/0267491 A1* | 10/2012 | Chiu | ..................... | F16M 13/00 |
| | | | | 248/221.11 |
| 2017/0302322 A1* | 10/2017 | Harris | ................ | F16M 11/2021 |
| 2018/0216779 A1* | 8/2018 | Damiano | ............. | F16M 13/02 |
| 2020/0138174 A1* | 5/2020 | Qi | .......................... | H04M 1/04 |
| 2021/0043117 A1* | 2/2021 | White | .................... | G09F 3/204 |
| 2021/0169239 A1* | 6/2021 | Gulick, Jr. | ......... | E05B 73/0082 |
| 2022/0400563 A1* | 12/2022 | Wu | ........................ | G09F 23/06 |

* cited by examiner

ELECTRONIC TABLE CARD, FIXED SEAT OF ELECTRONIC TABLE CARD, AND ELECTRONIC TABLE CARD ASSEMBLY

CROSS-REFERENCE TO RELATED APPLICATIONS

This application is based on and claims the benefit of and priority to Chinese Utility Model Application No. 201922019988.7, filed on Nov. 19, 2019, the entire contents of which being incorporated herein by reference.

TECHNICAL FIELD

The present disclosure relates to the technical field of electronic display, in particular to an electronic table card, a fixed seat of an electronic table card, and an electronic table card assembly.

BACKGROUND

At present, the desktop name badges used in conference rooms are often labeled with signatures on the paper. As for the name badges in the traditional form, it is required to do a lot of work in placing the name badges before the conference and receiving the name badges after the conference, and it is troublesome to replace the name badges when the conference participants are temporarily determined.

SUMMARY

The present disclosure provides an electronic table card, a fixed seat of an electronic table card and an electronic table card assembly. The electronic table card solves the problem that the traditional paper name badge is troublesome to be replaced and inconvenient to be stored.

To achieve the above objectives, the present disclosure provides the following technical solutions.

An electronic table card includes an electronic display screen and a protrusion disposed on a back of the electronic display screen, in which a clamping slot is respectively formed at both sides of the protrusion, opening directions of the clamping slots are opposite to each other, and an extending direction of each of the clamping slots is perpendicular to a direction from a top to a bottom of the electronic display screen.

In the above electronic table card, the electronic table card includes an electronic display screen and a protrusion disposed on the back of the electronic display screen, and a clamping slot is respectively formed at both sides of the protrusion. When using the electronic table card, the protrusion of the electronic table card may be probed into the triangle structure of a base seat through a mounting opening on the base seat, and the electronic display screen may be clamped and extend into the clamping slot of the protrusion in the triangular structure through the fixing assembly, so that the electronic display screen is fixed on a side plate of the base seat through the protrusion, to achieve the display function.

The electronic table card provided by the present disclosure uses the electronic display screen to display information, which is easy to operate, convenient for the operator to update the displayed information, and can reduce the work difficulty of the operator.

Therefore, the electronic table card solves the problem that the traditional paper name badge is troublesome to be replaced and inconvenient to be stored and placed.

Preferably, the electronic table card further includes a limit groove with an opening on an inner surface of the clamping slot.

Preferably, the electronic table card further includes a battery box on the back of the electronic display screen, in which the battery box forms the protrusion.

The present disclosure also provides a fixed seat of an electronic table card, which includes a base seat and a fixing assembly, in which the base seat comprises a bottom plate and two side plates, the two side plates cooperate with the bottom plate to form a triangular structure, each of the side plates is provided with a mounting opening that has a shape corresponding to that of the protrusion of the electronic table card and allows the protrusion probe into the triangular structure, and the fixing assembly is used to be clamped with the clamping slot of the protrusion extending into the triangular structure.

Preferably, the fixing assembly is a slip sheet including a body, a first clamping portion and a second clamping portion, and the first clamping portion and the second clamping portion are at opposite sides of the body.

Preferably, an avoidance opening having a shape matched with that of a side edge of the protrusion is formed between the body and the clamping portion.

Preferably, a holding portion that facilitates operating the slip sheet is formed at an end of the body facing away from the avoidance opening.

Preferably, a flange is formed at a side of the slip sheet facing away from the protrusion.

Preferably, a folded edge is formed at a side edge of the clamping portion facing away from the avoidance opening.

Preferably, the clamping portion is provided with a limit projection that has a shape matched with that of the limit groove of the electronic table card and is used to clamp with the limit groove.

Preferably, a chute that has an opening facing to the other side plate is formed at a side of the side plate facing to the triangular structure, and the mounting opening is formed at a bottom of the chute.

Preferably, the base seat is an integrally formed structure.

Preferably, each of the first clamping portion and the second clamping portion of the slip sheet forms an included angle with the body.

Preferably, an inclination angle of the base seat is adjusted to be consistent with an inclination angle of the slip sheet when the slip sheet is used for fixing operation.

The present disclosure also provides an electronic table card assembly, which includes at least one of the electronic table card provided by the above technical solutions and the fixed seat provided by the above technical solutions. The electronic table card may be probed into the triangle structure of the fixed seat, and the fixing assembly of the fixed seat is clamped with the clamping slot of the protrusion extending into the triangle structure.

Preferably, the fixing assembly is a slip sheet including a body, a first clamping portion and a second clamping portion, and the first clamping portion and the second clamping portion are at opposite sides of the body.

Preferably, when the slip sheet is used for fixing, the first clamping portion of the slip sheet is clamped into a top clamping slot of the protrusion, and the second clamping portion of the slip sheet is clamped into a bottom clamping slot of the protrusion.

Preferably, an included angle is formed between each of the first clamping portion and the second clamping portion of the slip sheet and the body.

Preferably, when the electronic table card is placed in a double-sided form by using the slip sheet, end hooks of the first clamping portion and the second clamping portion of the slip sheet are respectively clamped into the top clamping slots of the protrusions of two of the electronic table cards.

Preferably, when the electronic table card is placed in the single-sided form by using the slip sheet, an end hook of the first clamping portion of the slip sheet is clamped into the top clamping slot of the protrusion of the electronic table card, and an end hook of the second clamping portion of the slip sheet is clamped into the bottom clamping slot of the protrusion of the electronic table card.

DETAILED DESCRIPTION

The technical solution in the embodiments of the present disclosure will be clearly and completely described below with reference to the drawings in the embodiment of the present disclosure. Obviously, the described embodiments are only some of the embodiments of the present disclosure, but not all embodiments. Based on the embodiments in the present disclosure, all other embodiments obtained by those ordinary skilled in the art without any creative work belong to the protection scope of the present disclosure.

The present disclosure provides an electronic table card assembly, which includes any one of the electronic table cards provided by at least one of the following technical solutions and any one of the fixed seats provided by the following technical solutions. A protrusion 2 of the electronic table card may be probed into a triangular structure of the fixed seat, and then a fixing assembly may be clamped into a clamping slot of the protrusion 2 probed into the triangular structure when the electronic table card is secured, as shown in FIGS. 1 and 2.

Figure 1:
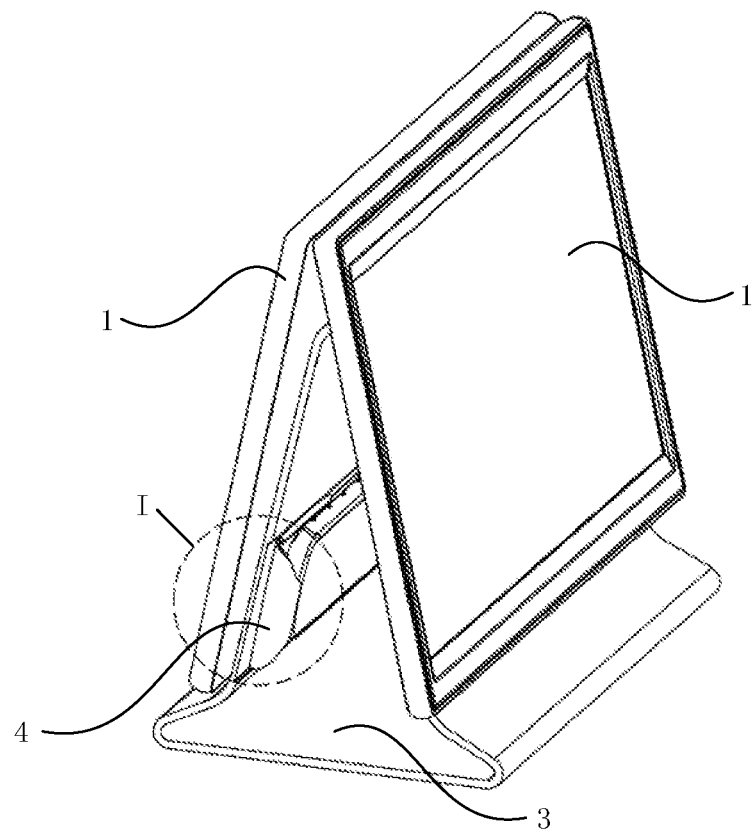
FIG. 1 is a schematic structural view of an electronic table card assembly provided in an embodiment of the present disclosure.
Figure 2:
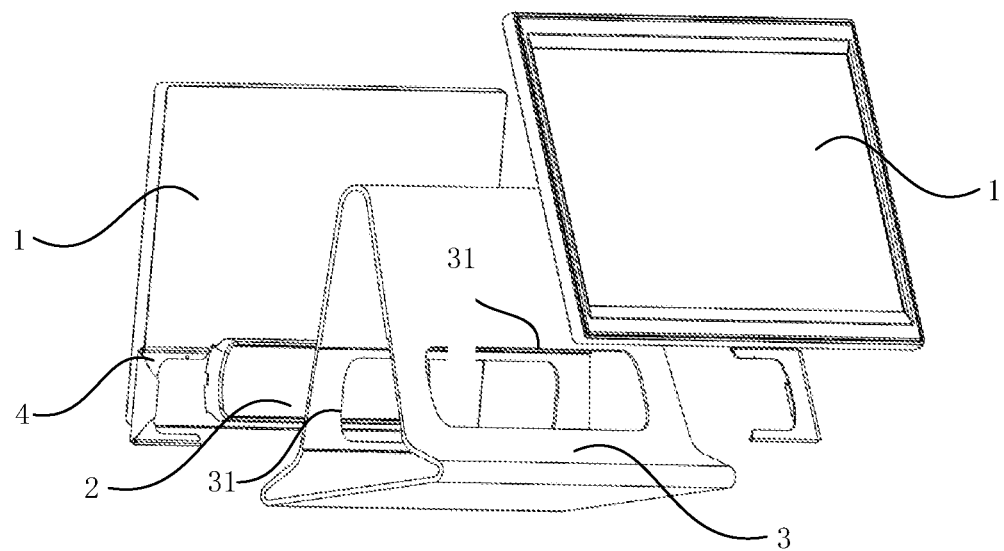
FIG. 2 is an exploded structure view of an electronic table card assembly provided by an embodiment of the present disclosure.

With reference to FIGS. 1 and 2, the present disclosure provides an electronic table card including an electronic display screen 1 and a protrusion 2 disposed on a back of the electronic display screen 1. A clamping slot is respectively formed at both sides of the protrusion 2, opening directions of the two clamping slots are opposite to each other, and an extending direction of each of the clamping slots is perpendicular to a direction from the top to the bottom of the electronic display screen 1.

In the above-mentioned electronic table card, the electronic table card includes an electronic display screen 1 and a protrusion 2. The protrusion 2 is disposed on the back of the electronic display screen 1, and a clamping slot is respectively formed at both sides of the protrusion 2. When the electronic table card is used, the protrusion 2 of the electronic table card may be probed into the triangle structure of a base seat 3 through a mounting opening 31 on the base seat 3, and the electronic display screen 1 may be clamped and extend into the clamping slot of the protrusion 2 in the triangular structure by means of the fixing assembly, so as to be fixed on a side plate of the base seat 3 by the protrusion 2, thus achieve the display function.

The electronic table card provided by the present disclosure uses the electronic display screen 1 to display information, It is easy to operate, convenient for the operator to update the displayed information, and can reduce the operator's work difficulty.

Therefore, the electronic table card as above mentioned solves the problem that the traditional paper name badge is troublesome to be replaced and inconvenient to be stored and placed.

It should be noted that the arrangement manner that the opening directions of the two clamping slots are opposite to each other is provided so that when the electronic display screen 1 is fixed by the fixing assembly, the fixing assembly may simultaneously be clamped and extend into the two clamping slots on the protrusion 2 in the triangular structure, so as to facilitate improving the stability of the electronic display screen 1 after installation.

In addition, it should be noted that the extending direction of the clamping slot is perpendicular to a direction from the top to the bottom of the electronic display screen 1, so as to avoid the interference between the fixing assembly and a side plate forming the triangular structure when the fixing assembly is installed, and is convenient for the user to install and disassemble the electronic table card.

On the basis of the above technical solution, in order to improve the stability of the connection relationship between the fixed seat and the electronic table card provided by the present disclosure, the electronic table card of the present disclosure also includes a limit groove 45 with an opening located on the inner surface of the clamping slot 44.

A limit projection on the fixing assembly may be clamped into the limit groove when the fixing assembly is clamped into the clamping slot of the protrusion 2, so as to prevent the fixing assembly from falling out of the clamping slot and the protrusion 2 from going out of the mounting opening 31 of the base seat 3.

On the basis of the above technical solution, as a preferred embodiment, the electronic table card provided by the present disclosure further includes a battery box disposed on the back of the electronic display screen 1, and the battery box forms the protrusion 2.

It should be noted that the limit groove 45 may be a hole groove reserved for the battery box.

Specifically, the battery box on the back of the electronic display screen 1 may be used, and a clamping slot is respectively formed at both sides of the battery box. When the electronic display screen 1 is required to be fixed, the battery box may be probed into the triangular structure through the mounting opening 31 of the base seat 3, and fixed by the fixing assembly.

The present disclosure also provides a fixed seat of an electronic table card including a base seat 3 and a fixing assembly, wherein the base seat 3 includes a bottom plate and two side plates, and the two side plates cooperate with the bottom plate to form a triangular structure. Each of the side plates is provided with a mounting opening 31 that has a shape corresponding to that of the protrusion 2 of the electronic table card and allows the protrusion 2 to probe into the triangular structure, and the fixing assembly is used to clamp with the clamping slot of the protrusion 2 extending into the triangular structure.

When the above-mentioned fixed seat is used, the protrusion 2 of the electronic table card may be probed into the triangular structure of the base seat 3 through the mounting opening 31 on the base seat 3, and the fixing assembly is clamped and extended into the clamping slot of the protrusion 2 in the triangular structure, so that the electronic display screen 1 may be fixed on the side plate of the base seat 3 by the protrusion 2, so as to realize the display function.

It should be noted that the fixed seat of the electronic table card provided by the present disclosure facilitate for installation and disassembly of the electronic table card, and the fixed seat includes two side plates. Each of the side plates is provided with a mounting opening 31 that has a shape corresponding to that of the protrusion 2 of the electronic table card assembly and allows the protrusion 2 to probe into the triangular structure. The fixed seat provided by the present disclosure can selectively install one or two electronic table cards according to the user's requirements, so as to realize single-sided display or double-sided display.

In addition, in order to enhance the stability of the base seat 3, preferably, the base seat 3 has an integrally formed structure.

Figure 3:
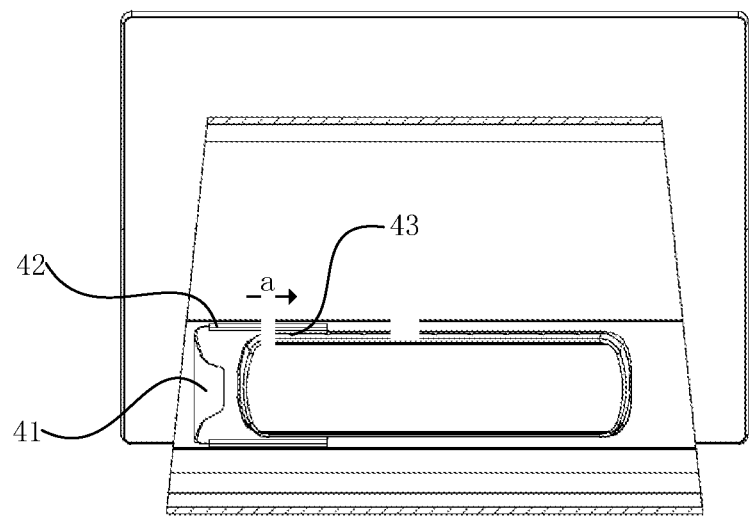
FIG. 3 is a semi-sectional structural view of FIG. 1.
Figure 4:
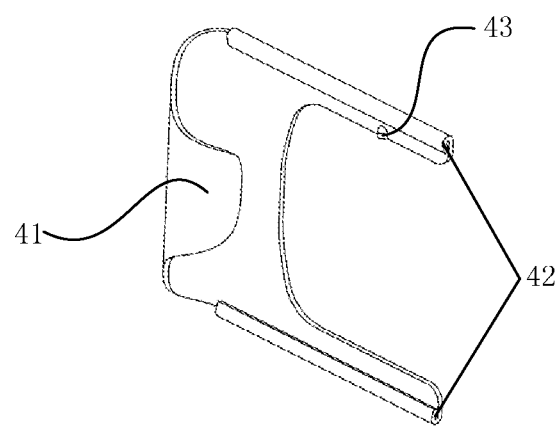
FIG. 4 is a schematic structural view of a slip sheet in a fixed seat provided by an embodiment of the present disclosure.

On the basis of the above technical solution, in an optional embodiment, as shown in FIGS. 3 and 4, the fixing assembly is a slip sheet 4 that includes a body, a first clamping portion and a second clamping portion. The first clamping portion and the second clamping portion are located at opposite sides of the body.

The slip sheet 4 may slide along the extending direction of the clamping slot to be clamped into and extended into the clamping slot of the protrusion 2 of the triangular structure. In order to facilitate for the clamping and disassembly of the slip sheet 4 and improve the stability of the connection relationship between the electronic display screen 1 and the base seat 3, an avoidance opening is formed between the body and the clamping portions of slip sheet 4, and has a shape matched with that of a side edge of protrusion 2.

Figure 5:
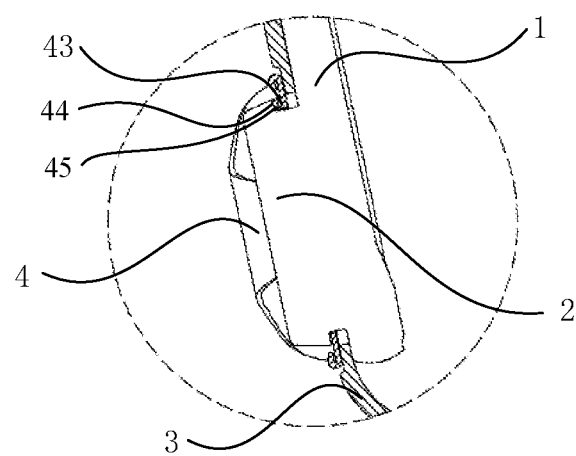
FIG. 5 is an enlarged schematic view at a position I in FIG. 1.

It should be noted that, when the electronic table card is placed in single-sided form, one of the slip sheets 4 may be used for fixing, specifically, the first clamping portion is clamped into a clamping slot 44 at the top of the battery box, and simultaneously, the second clamping portion is clamped into a clamping slot 44 at the bottom of the battery box, so that the limit effect can be achieved. As shown in FIG. 5, the first clamping portion and the second clamping portion are clamped into the clamping slots 44, and a side of the side plate facing to the electronic display screen 1 abuts against the electronic display screen 1. Each of the clamping portions is clamped between a surface at a side of the side plate facing away from the electronic display screen 1 and a side wall of the clamping slot 44.

Similarly, when the electronic table card is placed in a double-sided form, two slip sheets 4 may be used, and each of the slip sheets 4 is used to secure a protrusion 2 of the electronic table card. Specifically, as for each of the slip sheets, the first clamping portion of the slip sheet 4 may be clamped into a top clamping slot of the battery box (the clamping slot at the top of the battery box), and the second clamping portion may be clamped into a bottom clamping slot of the battery box (the clamping slot at the bottom of the battery box), so that the limit effect can be achieved.

Preferably, a holding portion is formed at an end of the body facing away from the avoidance opening, so as to facilitate operating the slip sheet 4.

Specifically, as shown in FIG. 4, a flange 41 may be rolled up at a side of the slip sheet 4 facing away from the protrusion 2, so that the edge of the slip sheet 4 is more rounded. It should be noted that this structure of the flange 41 may increase the overall operating thickness of the slip sheet 4, which is convenient for the user to plug in and out the slip sheet 4 when replacing the electronic table card.

On the basis of the above technical solutions, as a preferred embodiment, continuously referring to FIG. 4, a folded edge 42 is formed at a side edge of the clamping portion facing away from the avoidance opening.

It should be noted that the slip sheet 4 is provided with a folded edge 42 at each of the first clamping portion and the second clamping portion. This characteristic can not only ensure that a single side of the slip sheet 4 is narrow when it is in a limited space, but also solve the problem of strength, thus avoiding the insertion difficulty caused by bending when the slip sheet 4 is used. In addition, this structure of the folded edge 42 also avoids the problem of rowing hands caused by sharp side edges of the connecting portion.

It should be noted that, specifically, continuously referring to FIGS. 4 and 5, the clamping portion is provided with a limit projection 43 which has a shape matched with that of the limit groove of the electronic table card and is used for clamping with the limit groove, as shown in FIG. 4, the limit projection 43 may be formed only at the first clamping portion or the second clamping portion.

It should be noted that the limit projection 43 may be lightly matched with the limit groove reserved in the clamping slot of the electronic table card to play a certain positioning role, and there is a certain hand feeling when the slip sheet 4 slides in from a side along an "a" direction (as shown in FIG. 3), so that the user can feel that the slip sheet has reached the destination, thus avoiding aimlessly pushing and pulling.

On the basis of the above-mentioned technical solutions, in order to facilitate for the sliding stability of the slip sheet 4 and avoid the displacement of the slip sheet 4 during sliding, a chute 32 is formed at a side of the side plate facing to the triangular structure. The chute 32 has an opening facing to the other side plate, and a mounting opening 31 is formed at the bottom of the chute 32, as shown in FIGS. 2 and 3.

It should be noted that, in the above technical solutions, a raw material of slip sheet 4 is a sheet metal with uniform thickness, and the thickness of the slip sheet 4 may change in different functional applications by adding different characteristics such as folded edges and holding portions, to save the cost.

In another optional embodiment, the fixing assembly is slip sheet 5 including a body, a first clamping portion and a second clamping portion, and the first clamping portion and the second clamping portion are located at opposite sides of the body.

Each of the first clamping portion and the second clamping portion of the slip sheet 5 form an included angle with the body, and the included angle between the first clamping portion and the body, or the included angle between the second clamping portion and the body, is designed according to an angle of the clamping slot of the protrusion 2. When the slip sheet 5 is used for fixing operation, an inclination angle of the base seat 3 may be adjusted to be consistent with an inclination angle of the slip sheet 5.

Figure 6:
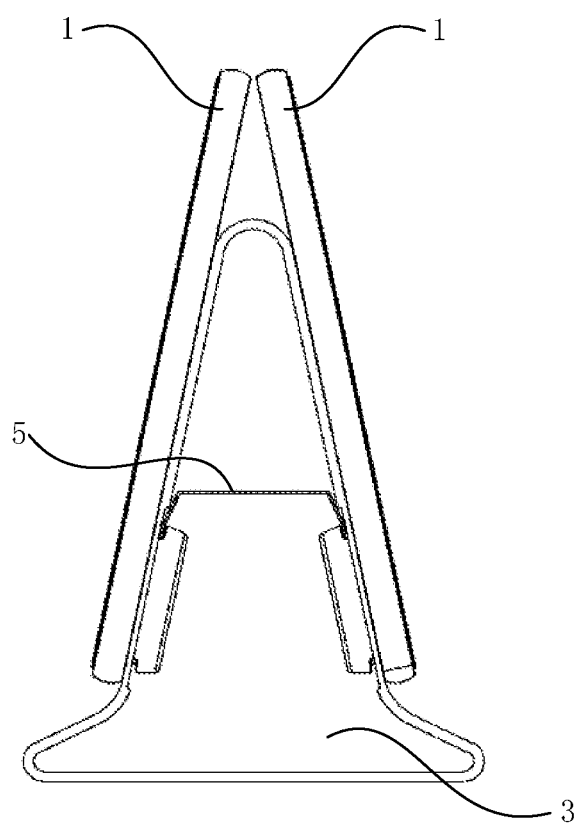
FIG. 6 is a schematic installation view of another slip sheet provided by an embodiment of the present disclosure.
Figure 7:
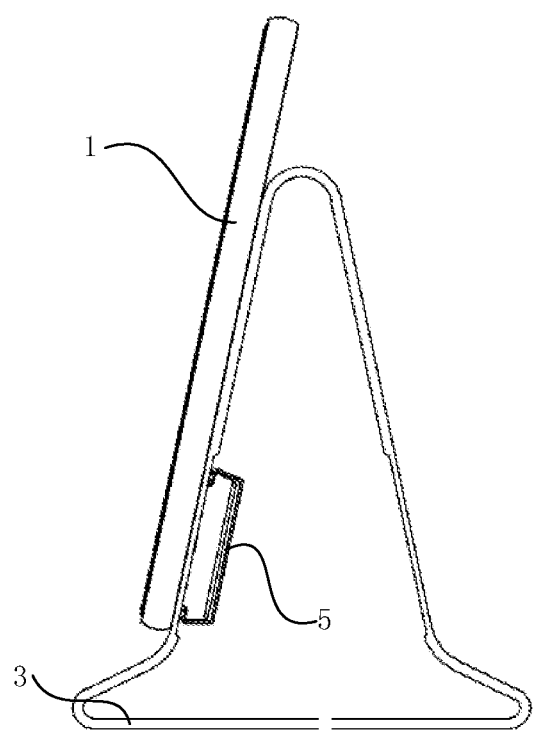
FIG. 7 is a schematic installation view of another slip sheet provided by an embodiment of the present disclosure.

Specifically, as shown in FIG. 6, when the electronic table card is placed in the double-sided form by using the slip sheet 5, the slip sheet 5 is horizontally inserted into the clamping slot, so that end hooks of the first clamping portion and the second clamping portion are respectively clamped into two clamping slots at the top of the battery boxes of the electronic table card to achieve the limit effect; as shown in FIG. 7, when the electronic table card is placed in the single-sided form by using the slip sheet 5, the slip sheet 5 may be vertically inserted into the triangular structure, so that an end hook of the first clamping portion is clamped into the clamping slot at the top of the battery box of the electronic table card, and simultaneously, an end hook of the second clamping portion is clamped into the clamping slot at the bottom of the battery box of the electronic table card, so that the limit effect can be achieved.

It should be noted that, in this embodiment, only one slip sheet 5 is used to be compatible with the single-sided placement and double-sided placement of the electronic table card, thus avoiding the storage or even loss of several slip sheets when only single-sided placement of the electronic table card is used.

Clearly, those skilled in the art can make various modifications and variations to the embodiments of the present disclosure without departing from the spirit and scope of the present disclosure. In this way, if these modifications and variations of the present disclosure fall within the scope of the present disclosure claim and its equivalent technology, the present disclosure is also intended to include these modifications and variations.

What is claimed is:

1. An electronic table card, comprising an electronic display screen and a protrusion disposed on a back of the electronic display screen, wherein a clamping slot is respectively formed at both sides of the protrusion, opening directions of the clamping slots are opposite to each other, and an extending direction of each of the clamping slots is perpendicular to a direction from a top to a bottom of the electronic display screen,
   wherein the electronic table card further comprises a limit groove opened on an inner surface of the clamping slot.

2. The electronic table card of claim 1, further comprising a battery box disposed on the back of the electronic display screen, wherein the battery box forms the protrusion.

3. An electronic table card assembly comprising at least one of an electronic table card and a fixed seat,
   wherein the electronic table card comprises an electronic display screen and a protrusion disposed on a back of the electronic display screen, wherein a clamping slot is respectively formed at both sides of the protrusion, opening directions of the clamping slots are opposite to each other, and an extending direction of each of the clamping slots is perpendicular to a direction from a top to a bottom of the electronic display screen, and
   wherein the fixed seat comprises a base seat and a fixing assembly, wherein the base seat comprises a bottom plate and two side plates, two of the side plates cooperate with the bottom plate to form a triangular structure, and each of the side plates is provided with a mounting opening that has a shape corresponding to that of the protrusion of the electronic table card and allows the protrusion to probe into the triangular structure; and the fixing assembly is used to be clamped with the clamping slot of the protrusion extending into the triangular structure.

4. The electronic table card assembly of claim 3, wherein the fixing assembly is a slip sheet including a body, a first clamping portion and a second clamping portion, and the first clamping portion and the second clamping portion are at opposite sides of the body.

5. The electronic table card assembly of claim 4, wherein when the slip sheet is used for fixing, the first clamping portion of the slip sheet is clamped into a top clamping slot of the protrusion, and the second clamping portion of the slip sheet is clamped into a bottom clamping slot of the protrusion.

6. The electronic table card assembly of claim 4, wherein an included angle is formed between each of the first clamping portion and the second clamping portion of the slip sheet and the body.

7. The electronic table card assembly of claim 6, wherein when the electronic table card is placed in a double-sided form by using the slip sheet, end hooks of the first clamping portion and the second clamping portion of the slip sheet are respectively clamped into the top clamping slots of the protrusions of two of the electronic table cards.

8. The electronic table card assembly of claim 6, wherein when the electronic table card is placed in the single-sided form by using the slip sheet, an end hook of the first clamping portion of the slip sheet is clamped into the top clamping slot of the protrusion of the electronic table card, and an end hook of the second clamping portion of the slip sheet is clamped into the bottom clamping slot of the protrusion of the electronic table card.

* * * * *